United States Patent [19]

Rines et al.

[11] Patent Number: 5,235,605
[45] Date of Patent: Aug. 10, 1993

[54] SOLID STATE LASER

[75] Inventors: Glen A. Rines, Hollis, N.H.; Peter F. Moulton, Concord; James Harrison, Cambridge, both of Mass.

[73] Assignee: Schwartz Electro-Optics, Inc., Orlando, Fla.

[21] Appl. No.: 978,027

[22] Filed: Nov. 18, 1992

Related U.S. Application Data

[63] Continuation of Ser. No. 649,413, Feb. 1, 1991, abandoned.

[51] Int. Cl.[5] ............................................. H01S 3/10
[52] U.S. Cl. ...................................... 372/20; 372/23; 372/66; 372/92; 372/107; 372/108; 372/100
[58] Field of Search .................... 372/100, 20, 19, 98, 372/92, 94, 107, 108, 66, 23

[56] References Cited

U.S. PATENT DOCUMENTS

| 3,675,154 | 7/1992 | Duguay et al. | 372/33 |
| 3,696,310 | 10/1972 | Paoli et al. | 372/101 |
| 3,764,937 | 10/1973 | Skolnick et al. | 372/100 |
| 4,227,159 | 10/1980 | Barrett et al. | 372/68 |
| 4,894,831 | 1/1990 | Alfrey | 372/19 |
| 4,914,663 | 4/1990 | Basu et al. | 372/18 |
| 4,918,704 | 4/1990 | Caprara et al. | 372/95 |
| 5,020,073 | 5/1991 | Alfrey et al. | 372/20 |
| 5,054,027 | 10/1991 | Goodberlet et al. | 372/97 |
| 5,066,291 | 11/1991 | Stewart | 350/326 |

OTHER PUBLICATIONS

Shand et al; ("Tunable Solid State Lasers"); Proc of the OSA Topical Meet. on Tunable Solid State Lasers May 1-3, 1989.

Spence et al; "60-sec Pulse Generation for a Self-Mode-Locked Ti: Sapphire Laser"; Opt. Lett. vol. 16, No. 1, Jan. 1, 1991.

Primary Examiner—Léon Scott, Jr.
Attorney, Agent, or Firm—Iandiorio & Dingman

[57] ABSTRACT

A wavelength-tunable, injection-seeded, dispersion-compensated, dispersively-pumped solid state laser includes a lasing medium; a highly reflective mirror; an output coupler; at least one isosceles Brewster prism oriented to the minimum deviation angle between the medium and the mirror for directing light of different wavelengths along different paths; means for varying the angle of the highly reflective mirror relative to the light from at least one Brewster angle for selecting a predetermined laser operating wavelength; a dispersion compensation apparatus associated with the lasing medium; a laser injection seeding port disposed between the dispersion compensation apparatus and one of the mirror and coupler and including a reflective surface at an acute non-Brewster angle to the laser beam for introducing a seed input; a dispersion compensation apparatus associated with the laser medium including opposite chirality optical elements; the lasing medium including a pump surface disposed at an acute angle to the laser beam to define a discrete path for the pumping laser beam separate from the pumped laser beam.

14 Claims, 5 Drawing Sheets

SOLID STATE LASER

This invention was made with government support under contract NAS 1-18457 awarded by NASA. The government has certain rights in this invention.

This is a continuation of application Ser. No. 07/649,413, filed Feb. 1, 1991 now abandoned.

FIELD OF INVENTION

This invention relates to a solid state laser utilizing variously an improved wavelength tuning mechanism, injection seeding, dispersive compensation, and/or dispersive pumping, and more particularly to such a solid state laser further utilizing double pumping and/or an unstable-resonator.

BACKGROUND OF INVENTION

Some solid state lasers such as titanium sapphire lasers are attractive in many applications because they are broadly tunable, as compared to other solid state and gas lasers which tend to have more discrete, narrow, line outputs. Titanium sapphire lasers are also desirable because they have high gain and as solid state devices are also durable and stable. Although these lasers are broadly tunable, the gain varies greatly with wavelength and promoting lasing at the lower gain wavelengths can be difficult. Tuning such a laser to overcome the high gain at center wavelengths and still be low-loss at a desired wavelength may otherwise compromise laser performance. Titanium sapphire lasers also have a very short upper state or fluorescence lifetime (approximately 3.2 $\mu$/sec) which requires very short pulse pumping excitation that approaches the maximum power dissipation capability of the crystal. The risk of loss and damage from the high power can be mitigated by using Brewster-angle cuts on the crystal. Brewster-angle cuts are minimally reflective (highly transparent) to "P" field polarized light but highly reflective to "S" polarization. Thus Brewster-cut crystals provide high transmissivity (low reflectivity loss) without the need for antireflection coatings which are very vulnerable to the high power, short duration pumping pulses. However, the use of Brewster-angle surfaces introduces refractive dispersion problems in the cavity: different wavelengths are directed along different paths.

The desired spectrally narrow or pure (single frequency) laser output can be more nearly achieved with titanium sapphire lasers by use of a seed input in addition to the pumping input. But this has shortcomings. Seed input can be introduced wherever there is laser energy escaping. For example, seed input can be supplied at the output but this requires a Faraday isolator which is complex and puts at risk the seed source. The seed input could also be introduced at the other end of the cavity at the high-reflectivity surface. But this is a problem when that surface must be moved about in order to tune the laser to a desired wavelength and so the seed input must be moved with it. Another problem occurs with titanium sapphire crystals when the pumping energy required approaches the upper limit of the crystal capacity, which can vary from 5 or 10 Joules to 50 Joules or more per square centimeter at the crystal face, depending upon the crystal quality and purity. Not only does high pumping energy put the crystal structure at risk but it induces parasitic laser action in the crystal.

Separately, it is well understood that stable laser oscillators cannot provide more than tens of millijoules of diffraction-limited output before reaching a practical limit due to optical damage. This is so because the $TEM_{oo}$ mode diameter for stable oscillators is limited to a few millimeters, which leads to high peak power densities on intracavity components at both pump and laser wavelengths. That is, they do not have energy scalability. Unstable laser oscillators, in contrast, provide a simple, compact means of increasing the output energy of diffraction limited oscillation. But conventional unstable oscillators typically provide an annular, or doughnut-shaped output with severe diffraction at the center.

SUMMARY OF INVENTION

It is therefore an object of this invention to provide an improved solid state laser.

It is a further object of this invention to provide such a laser having an improved wavelength tuning mechanism for adjusting the operating wavelength.

It is a further object of this invention to provide such a laser having an improved laser injection seeding port.

It is a further object of this invention to provide such a laser having an improved dispersion compensation.

It is a further object of this invention to provide such a laser which is dispersively pumped.

It is a further object of this invention to provide such a laser which is doubly pumped.

It is a further object of this invention to provide such a laser which uses an unstable-resonator.

It is a further object of this invention to provide such a laser which is wavelength-tunable, injection-seeded, dispersion-compensated, and dispersively pumped.

It is a further object of this invention to provide such a laser which is broadly tunable yet has high power output at off-center wavelengths without compromising other performance criteria.

It is a further object of this invention to provide such a laser which uses refractive dispersion to advantage in providing dispersive pumping, yet compensates for refractive dispersions to avoid beam steering as a function of wavelength, thereby providing a stable injection seed port and output beam.

It is a further object of this invention to provide such an improved solid state laser which is highly efficient to virtually the quantum-limited conversion of pump energy to output energy.

It is a further object of this invention to provide such an improved solid state laser which is energy scalable without risk of damage to the laser or optical elements.

It is a further object of this invention to provide such an improved solid state laser which is broadly tunable yet provides narrow spectral line output at the tuned wavelength.

It is a further object of this invention to provide such an improved solid state laser which has excellent spatial mode quality with a smoothly varying intensity cross section.

It is a further object of this invention to provide such an improved solid state laser which can operate at high energy levels in a single mode.

It is a further object of this invention to provide such an improved solid state laser in which the laser beam position is stable throughout the tuning range.

The invention results from the realization that a truly effective solid state laser having the features of high efficiency, energy scalability, excellent spatial mode quality, single-mode performance and broadband tuning can be achieved by variously utilizing wavelength tunability, injection seeding, dispersion compensation, and dispersive pumping, and that further improvements can be realized using unstable-resonator and laser pumping.

This invention features a wavelength tuning mechanism for adjusting the operating wavelength of a solid state laser. There is a lasing medium, a highly reflective mirror, and an output coupler. There is at least one isosceles Brewster prism oriented at the minimum deviation angle between the medium and the mirror for directing light of different wavelengths along different paths. There are also means for varying the angle of the highly reflective mirror relative to the light from at least one of the Brewster prisms for selecting a predetermined laser operating wavelength. In a preferred embodiment there are a plurality of such Brewster prisms in series in the light path between the medium and the mirror. The lasing medium may be titanium sapphire. The laser may be a standing wave laser, a ring laser and it may include an unstable-resonator.

The invention also features an injection-seeded solid state laser including a lasing medium, a highly reflective mirror, and an output coupler. There is a dispersion compensation apparatus associated with the lasing medium and a laser injection seeding port disposed between the dispersion compensation apparatus and one of the mirror and couplers, and including a reflective surface at an acute non-Brewster angle to the laser beam for introducing a seeded port. In a preferred embodiment, the reflective surface may be a near-Brewster angle facet of an isosceles prism. The lasing medium may be titanium sapphire. The dispersion compensation apparatus may include opposite-chirality optical elements and at least one of the optical elements may include the lasing medium. The laser may be a standing wave laser or a ring laser; it may utilize an unstable-resonator.

The invention also features a dispersion-compensation tunable solid state laser including a lasing medium, a highly reflective mirror, and an output coupler. The dispersion-compensation apparatus is associated with the laser medium and includes opposite-chirality optical elements. In a preferred embodiment the optical elements may be integral with the lasing medium. The lasing medium may include two laser crystals, each integral with one of the optical elements of opposite chirality. The lasing medium may be titanium sapphire. The laser may be a standing wave or ring type laser and it may include an unstable-resonator.

The invention also features a dispersively-pumped solid state laser including a lasing medium, a highly reflective mirror and an output coupler. The lasing medium includes a pumped surface disposed at an acute angle to the laser beam to define a discrete path for the pumping laser beam separate from the pumped laser beam. In a preferred embodiment the acute angle may be at a Brewster angle, the discrete path may extend directly from the pumped surface to the pumping laser, and the lasing medium may be titanium sapphire. The laser may be a standing wave laser or a ring laser and may include an unstable-resonator.

The invention also features a double-pumped solid state laser including a lasing medium, a highly reflective mirror, an output coupler, and first and second pump ports at either end of the lasing medium for independently receiving separate pumping means. In a preferred embodiment, the pump ports may be at an acute angle to the laser beam for defining a discrete path for the pumping laser beam separate from the pumped laser beam. The acute angle may be the Brewster angle and the lasing medium may be titanium sapphire. The laser may be a standing wave or ring laser and it may include an unstable resonator.

The invention also features a laser-pumped unstable-resonator solid state laser including a lasing medium, a highly reflective mirror, a pumping laser port for receiving the pumping beam from the pumping laser, and an optical coupler including a graded reflectivity mirror. In a preferred embodiment the laser may be a ring laser or a standing wave laser and the lasing medium may be titanium sapphire.

In a most comprehensive form the invention features a wavelength-tunable, injection-seeded, dispersion-compensated, dispersively-pumped solid state laser. There is a lasing medium, a highly reflective mirror, and an output coupler. There is at least one isosceles Brewster prism oriented at the minimum deviation angle between the medium and the mirror for directing light of different wavelengths along different paths. There are also means for varying the angle of the highly reflective mirror relative to the light from at least one Brewster prism for selecting a predetermined laser operating wavelength. A dispersion compensation apparatus is associated with the lasing medium and the laser injection seeding port is disposed between the dispersion compensation apparatus and one of the mirror and couplers and including a reflective surface at an acute, non-Brewster angle to the laser beam for introducing a seed input. A dispersion compensation apparatus is associated with the laser medium and includes opposite chirality optical elements. The lasing medium includes a pumped surface disposed at an acute angle to the laser beam to define a discrete path to the pumping laser beam separate from the pumped laser beam.

DISCLOSURE OF PREFERRED EMBODIMENT

Other objects, features and advantages will occur to those skilled in the art from the following description of a preferred embodiment and the accompanying drawings, in which.

Figure 1:
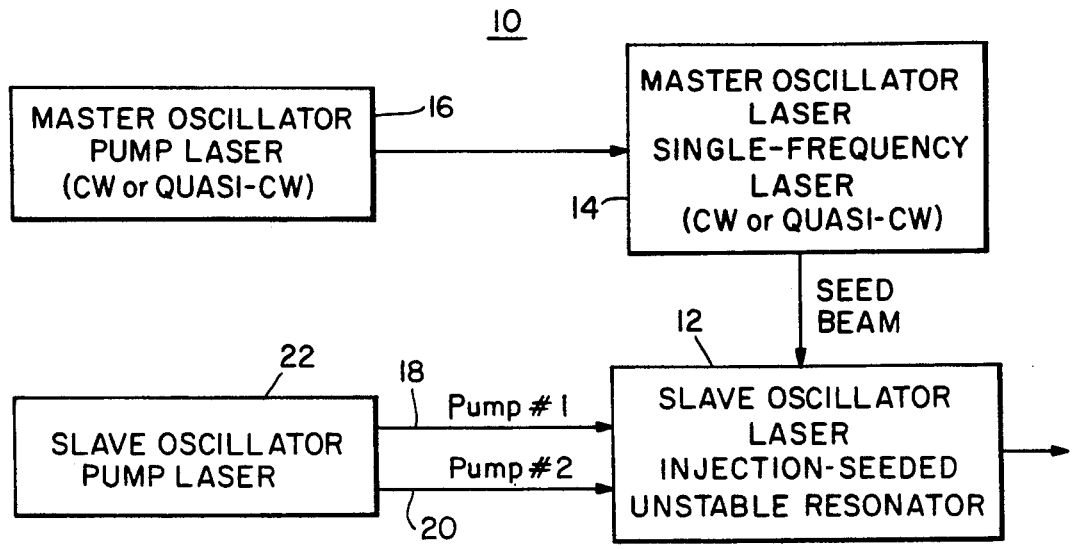
FIG. 1 is a block diagram of a laser system employing a master oscillator laser to provide an injection seed means to a slave oscillator laser according to this invention.

There is shown in FIG. 1 a laser system 10 using a slave oscillator 12 according to this invention. Master oscillator laser 14 is energized by master oscillator pump laser 16 and slave oscillator laser 12 receives two pumping beams 18 and 20 from slave oscillator pump laser 22.

Figure 2:
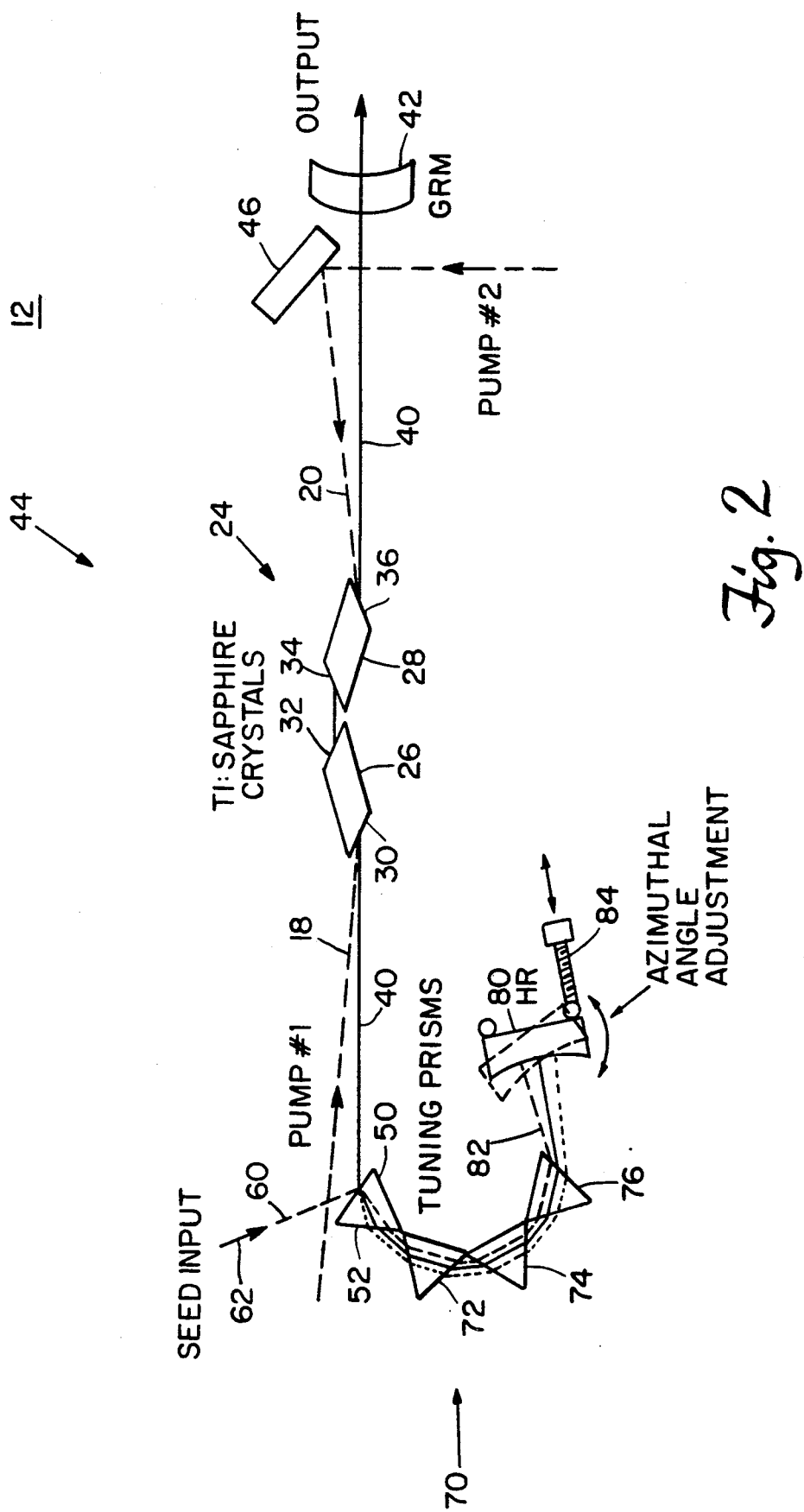
FIG. 2 is a more detailed schematic diagram of the slave oscillator laser of FIG. 1 according to this invention.

In one specific embodiment, slave oscillator 12, FIG. 2, employs a lasing medium 24 consisting of two titanium sapphire crystals 26 and 28 of opposite chirality and having Brewster-cut ends 30, 32, 34 and 26. Beams 18 and 20 are typically in a green wavelength and produce a laser beam 40 in the red or infrared range. Output coupler 42 is a graded-reflectivity mirror which eliminates the diffraction effects which occur in unstable resonator 44 of laser 12. Pump beam 18 is fed directly into face 30 of crystal 26, while pump beam 20 is reflected from mirror 46 before striking face 36 of crystal 28.

The dispersion characteristics of each of crystals 26 and 28 are used to advantage to separate green pumping beams 18 and 20 from the red laser beam 40 so that beams 18 and 20 may be directed to laser crystals 26 and 28 without interfering or requiring any further optical elements, for example as shown with respect to pump beam 18. Pump beam 20, in contrast, is shown as using a single optical element 46 to obtain the proper direction toward face 36 of crystal 28. The use of two opposite-chirality crystals 26 and 28 provides a dispersion compensation which does not interfere with the pumping means but enables the lasing beam 40 to remain fixed in space through a broad band tuning range. Thus beam 40 remains fixed in space between face 36 of crystal 28 and output coupler or mirror 42, and also between face 30 of crystal 26 and the surface 30 of the first tuning prism 52.

Since beam 40 is fixed over the full broadband range of wavelength between face 30 and face 50, there is a finite output along path 60 which can be used as the input path for the injection seed beam 62. Face 50 is an acute angle, preferably a near-Brewster angle but not the Brewster angle, in order to afford at least some small portion of reflectivity in the nature of 0.5 or 2% typically.

The advantage of having two pumping beams 18 and 20 instead of one is that the maximum pumping power can be doubled since only half is presented to each crystal face 30 and 36. Although in FIG. 2 the lasing medium 24 is shown as two crystals 26 and 28, the double pumping advantage works as well with a single crystal according to this invention.

While the seed input beam 62 of path 60 provides a substantial narrowing of the laser beam frequency spectral line, the broadband tuning selectivity is accomplished by a tuning mechanism 70 including at least one isosceles prism 52 and may, as shown in FIG. 2, include a plurality of such prisms, 72, 74 and 76, for example, arranged in series between the lasing medium 24 and the highly reflective mirror 80. In a preferred embodiment each of prisms 52, 72, 74 and 76 may be an isosceles Brewster prism oriented at the minimum deviation angle so that laser beam 40 is spatially dispersed into a plurality of lines 82 as a function of wavelength which can be discretely selected by orienting mirror 80 with the use of adjustment mechanism 84 to select the one desired wavelength for laser beam 40. The surface 50 of prism 52 is not exactly the Brewster angle but is at a near-Brewster angle in order to provide the finite reflection path 60 as explained earlier. Crystals 26 and 28 may be made of titanium sapphire, for example.

Figure 3:
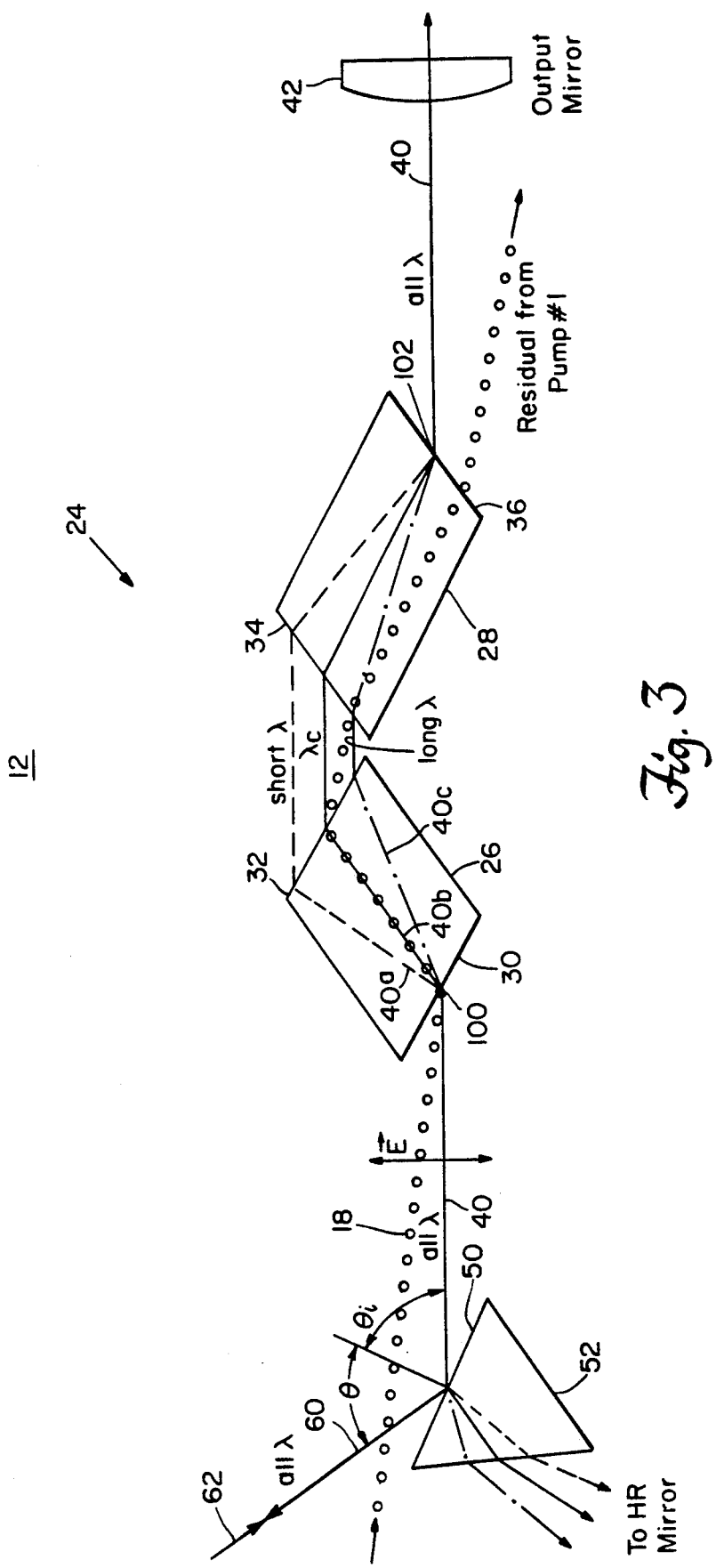
FIG. 3 is an enlarged detail view of a portion of the laser of FIG. 2 illustrating the pumping and dispersion compensation which occurs in the laser of FIG. 2.

The manner in which crystals 26 and 28 function to achieve dispersion compensation as well as provide for dispersive pumping can be seen in greater detail in FIG. 3, where the laser beam 40 disperses into a plurality of paths 40a, b and c, between point 20 on face 30 and point 102 on face 36. However, because of the opposite chirality of crystals 26 and 28 and the Brewster angle of faces 30, 32, 34 and 36, beam 40 remains fixed: that is, there is no beam steering occurring, regardless of what wavelength may be present, either the center wavelength 40b, or a shorter wavelength 40a, or a longer wavelength 40c. In contrast, while beam 40 is fixed in space by this accommodation of the dispersion in crystals 26 and 28, the dispersion which occurs from each individual crystal 26 and 28 is used to advantage to permit the pumping beams 18 and 20 (not shown in FIG. 3) to be maintained discrete and separate from beam 40, while still being properly aligned within each crystal. That is, pumping beam 18 is enabled by this dispersion effect to be delivered clear of prism 52 to enter and pump along the preferred pumping axis and then to exit with its residual energy directed off along a path which does not interfere with the remaining operation. Pumping beam 20, not shown in FIG. 3, is treated in a similar fashion by crystals 26 and 28. Beam 40 does disperse beginning at prism 52 and continuing through any additional prisms such as prisms 72, 74, and 76, as shown in FIG. 2, until the beam finally is incident upon highly-reflective mirror 80.

Figure 4:
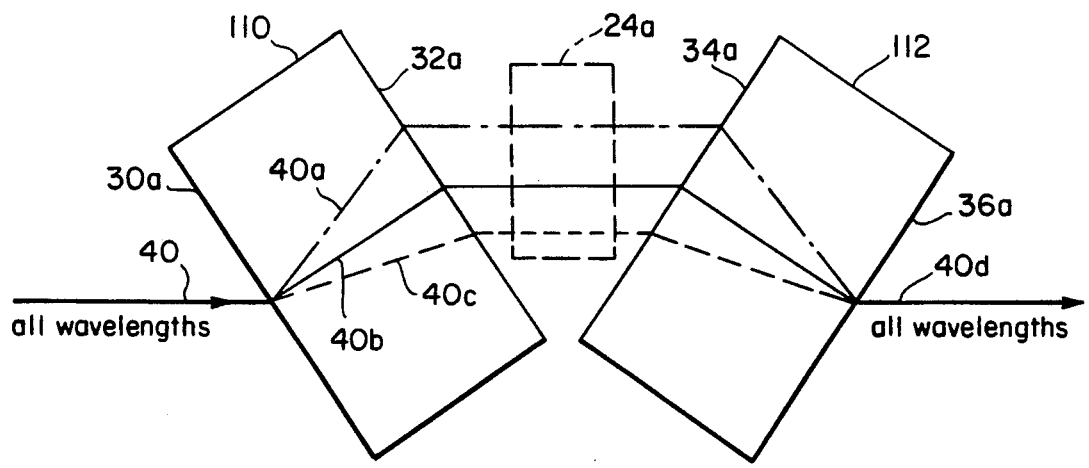
FIG. 4 is a schematic diagram of another form of dispersion compensation for the laser of FIG. 2.
Figure 5:
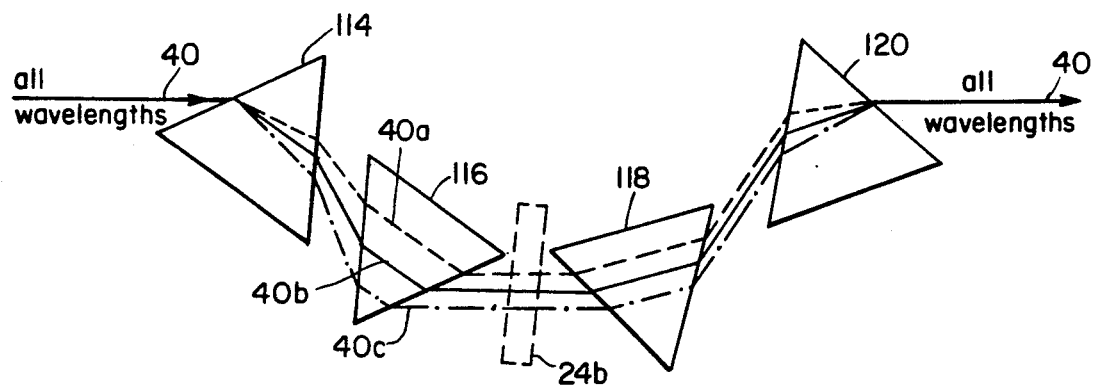
FIG. 5 is a schematic diagram of yet another form of dispersion compensation for the laser of FIG. 2.

Although in FIGS. 2 and 3 the dispersion compensation is integral with the lasing medium, this is not a necessary limitation of the invention. The dispersion compensation mechanism may be simply a pair of plain parallel windows 110, 112, FIG. 4, which are associated with the lasing medium 24a, for example, which may be placed between them. In another configuration the dispersion compensation can be effected by a series of refractive prisms 114, 116, 118 and 120 FIG. 5, which can be associated with the gain medium 24 being placed midway in the series for example.

Figure 6:
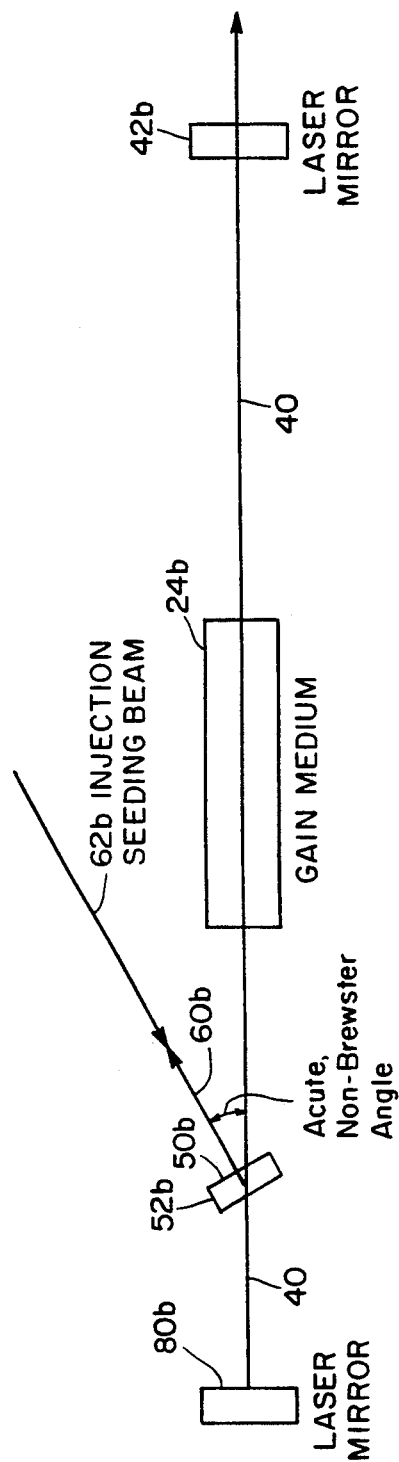
FIG. 6 is a simplified schematic diagram of another configuration for the injection seeding port shown in FIG. 2.

Although in FIGS. 2 and 3 the injection seed port for reflective surface 50 is shown as a near-Brewster-angle cut on an isosceles prism 52, this is not a necessary limitation of the invention. For example, as shown in FIG. 6, injection seed port 50a is simply a reflective surface on a support 52a that provides a path 60a that intersects with beam 40 as previously described so that the injection seeding beam 62a is fed back along beam 40 to lasing medium 24a, which may be a single crystal or a double crystal as shown in FIGS. 2 and 3.

Figure 8:
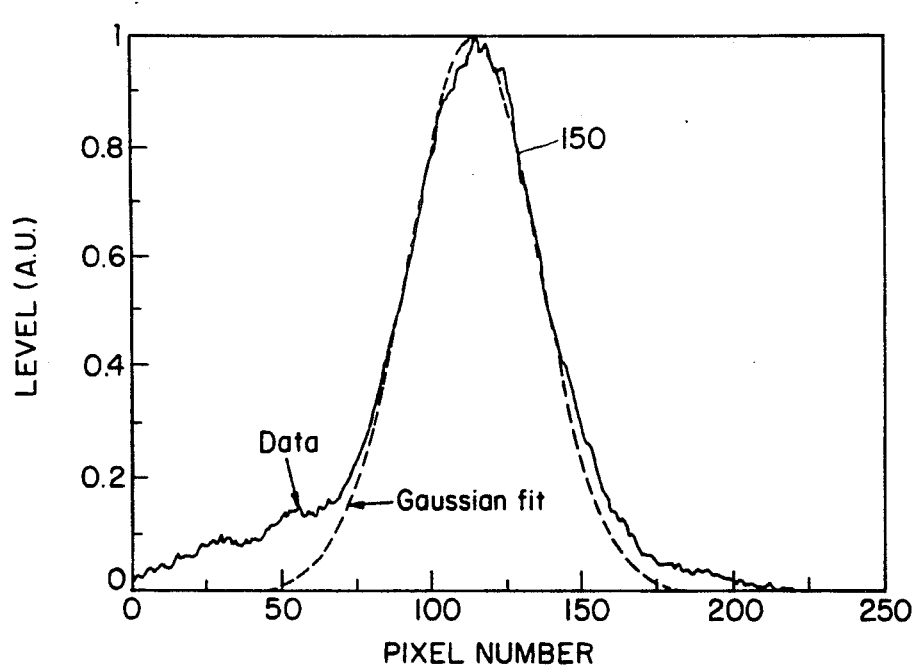
FIG. 8 is an illustration of the spatial profile of the output beam produced by the laser of this invention.
Figure 7:
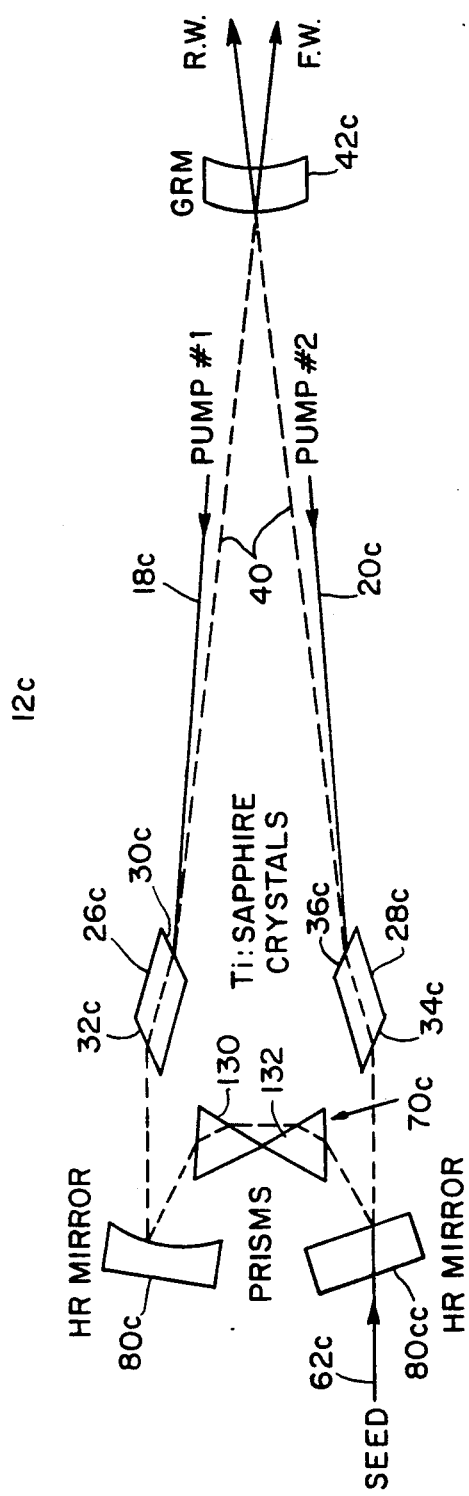
FIG. 7 is a schematic diagram of a ring laser employing the improved solid state laser of this invention.

Although thus far the embodiment has been explained in terms of a standing wave laser, this is not a necessary limitation of the invention, as a traveling wave or ring laser 12c, FIG. 7, can be implemented according to this invention as well. Ring laser 12c is similar in operation to laser 12 except that the seed port is no longer provided at a near-Brewster angle on one of the isosceles prisms 130, 132, in tuning mechanism 70c. In addition, the dispersion compensation in ring laser 12c occurs between face 30c and GRM output coupler mirror 42c, and face 36c and GRM output coupler 42c. All of the other attributes of proved tuning, dispersion compensation, dispersion pumping, double pumping, and the use of an unstable-resonator, are available in the ring laser 12c. Injection seeding is still available through either highly reflective mirror 80c or 80cc or transitions through the mirror, as indicated by the path of seed beam 62c. The functioning of the graded-reflectivity mirror 42 which overcomes the diffraction effects inherent in unstable oscillator outputs is shown in FIG. 8, where the Gaussian spatial intensity profile 150 closely approximates a theoretical Gaussian fit.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A multiple pump solid state tunable laser comprising:
   an output coupler for transmitting an output laser beam;
   a broadband tuning mechanism including at least one isosceles prism; and
   a dispersion compensation apparatus located between said output coupler and said broadband tuning mechanism including opposite chirality optical lasing elements each having a Brewster angle face for separately receiving a pump beam without interfering with the output laser beam.

2. The multiple pump solid state tunable laser of claim 1 in which said isosceles prism includes a near Brewster angle face for receiving a seed input supplied to one of said optical lasing elements.

3. The multiple pump solid state tunable laser of claim 1 in which said opposite chirality optical lasing elements are titanium sapphire.

4. The multiple pump solid state tunable laser of claim 1 in which said output coupler includes a graded reflectivity mirror for eliminating diffraction.

5. The multiple pump solid state tunable laser of claim 1 in which said broadband tuning mechanism further includes a high reflectivity mirror and a plurality of isosceles prisms arranged in series between said dispersion compensation apparatus and high reflectivity mirror.

6. The multiple pump solid state tunable laser of claim 5 in which each said isosceles prism is an isosceles Brewster prism orientated at a minimum deviation angle for spatially dispersing the laser beam into a plurality of wavelengths.

7. The multiple pump solid state tunable laser of claim 6 in which said high reflectivity mirror is adjustable for discretely selecting one said wavelength.

8. A solid state injection seeded laser comprising:
   an output coupler for transmitting an output laser beam;
   a seed port including a reflective surface at an acute non-Brewster angle; and
   a dispersion compensation apparatus located between said output coupler and said seed port including opposite chirality optical elements for fixing in space the output laser beam through a broadband tuning range.

9. The solid state injection seeded laser of claim 8 in which each said opposite chirality optical element includes a Brewster angle face for separately receiving a pump beam without interfering with the output laser beam.

10. The solid state injection seeded laser of claim 8 in which said opposite chirality optical elements are a titanium sapphire lasing medium.

11. The solid state injection seeded laser of claim 8 in which said opposite chirality optical elements include plane parallel windows and the laser further includes a lasing medium disposed between said plane parallel windows.

12. The solid state injection seeded laser of claim 8 in which said opposite chirality elements include a series of refractive prisms and the laser further includes a lasing medium disposed midway in the series of said refractive prisms.

13. A multiple pump solid state laser comprising:
   a pair of opposite chirality optical lasing elements each including end faces cut at the Brewster angle for receiving two pump beams without interfering with an output laser beam and for maximizing the total pumping power with decreased pump input on each said element thereby reducing possibility of damaging said end faces, each said element further including a Brewster angle face facing the other said element for dispersion compensation; and
   an output coupler for transmitting the output laser beam from said lasing elements and eliminating diffraction.

14. The multiple pump solid state laser of claim 13 further including a seed input pot including an isosceles prism having a near Brewster angle face for transmitting a seed input to one said end face of said pair of opposite chirality optical lasing elements.

* * * * *